UNITED STATES PATENT OFFICE.

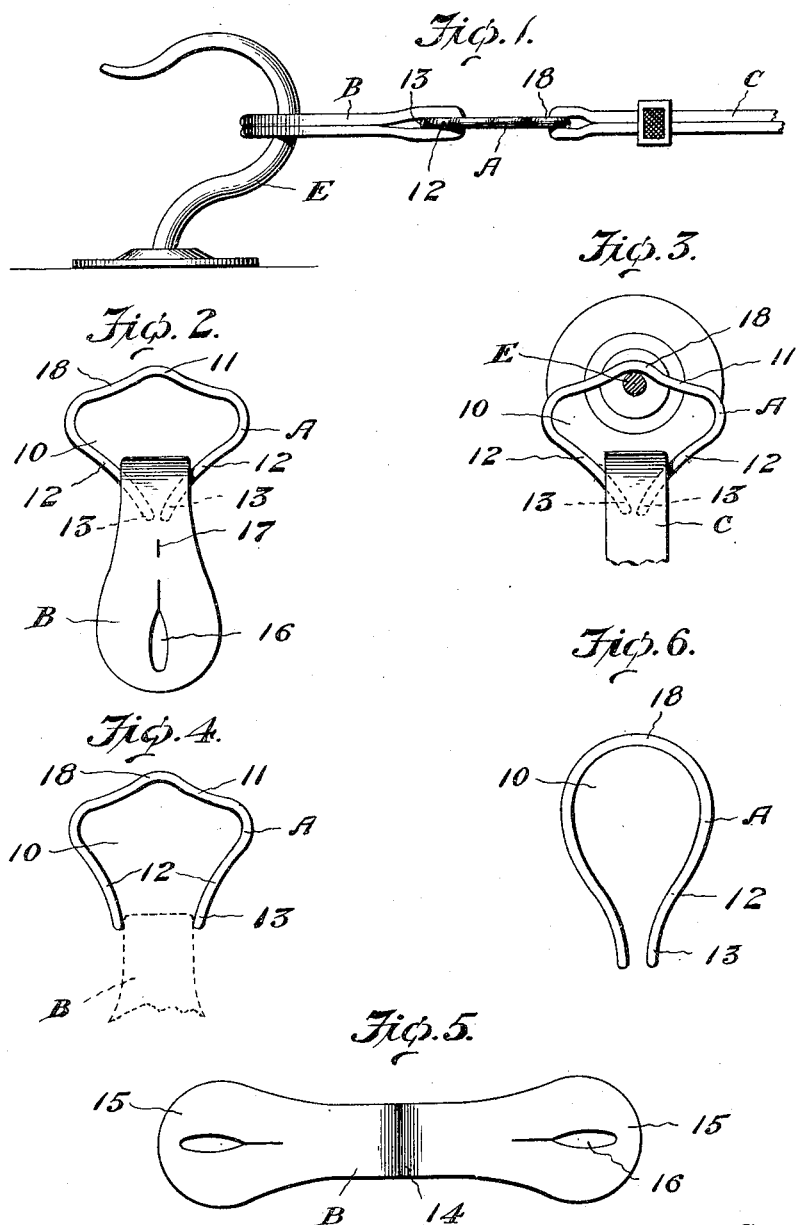
H. G. WEATHERILL.
CHECKREIN DEVICE.
APPLICATION FILED JAN. 15, 1914.
1,128,642.
Patented Feb. 16, 1915.

HENRY G. WEATHERILL, OF ELGIN, ILLINOIS.

CHECKREIN DEVICE.

1,128,642. Specification of Letters Patent. Patented Feb. 16, 1915.

Application filed January 15, 1914. Serial No. 812,272.

*To all whom it may concern:*

Be it known that I, HENRY G. WEATHERILL, a citizen of the United States, residing at Elgin, in the county of Kane and State of Illinois, have invented certain new and useful Improvements in Checkrein Devices; and I do hereby declare the following to be a full, clear, and exact description of the invention, such as will enable others skilled in the art to which it appertains to make and use the same.

This invention is an attachment for check reins, having for its object to withstand the strain ordinarily imposed upon the rein, but which will permit of the releasing of the rein from the check hook near the point of attachment in the event of accident causing abnormal strain on the parts.

When driving it is not infrequent to have a horse stumble, which causes the animal to throw its head downward exerting great and sudden strain on the check rein. It is estimated that in ordinary use of a check rein a horse imposes a strain of less than fifty pounds on the rein and hook, while a strain of 500 pounds might be placed on the parts when the horse stumbles. This extensive strain frequently breaks the check rein or hook besides injuring the horse.

This invention is characterized by providing a check rein attachment which will be released from the check hook when a sudden and great strain is imposed on the parts, and which can be readily restored to its normal position.

The invention contemplates also, the adaptation of an attachment which may be employed with hooks of various sizes and style, and the use of a resilient member of substantially the same strength, thereby enabling a dealer to carry the attachment for universal employment as distinguished from attachments which must accommodate the various sizes and styles of check hooks.

In the embodiment of the invention illustrated in the accompanying drawings—
Figure 1 is a side elevation of an attachment connected to a check hook, showing a portion of the check rein secured thereto. Fig. 2 is a plan view of the attachment. Fig. 3 is a plan view of the metallic resilient member in its closed position and detached from the flexible member. Fig. 4 is a similar view of the resilient member with its arms spread apart. Fig. 5 is a plan view of the flexible member opened outwardly. Fig. 6 is a plan view of another embodiment of the resilient member.

In the embodiment of the invention illustrated in the accompanying drawings, the attachment is illustrated as comprising a resilient member A bent from a single piece of suitable metal, or other suitable material, to form an eye 10. If desired the metal may be so bent along the edge which engages the check rein, as to provide a centering notch 11, although this notch may be omitted as illustrated in Fig. 6. The eye may be substantially ovoidal in shape as in Fig. 6, or the resilient member may be substantially triangular in shape as illustrated in Fig. 2. The strip of metal is again bent to form the converging arms 12 which terminate in substantial abutting ends 13, said arms being resilient to permit of their separation under abnormal strain. The material of the resilient member A is preferably such that it can be tempered so that its arms 12 will normally resist a pressure against them of substantially 50 pounds, or any other strength which may be found necessary.

In view of the various sizes and styles of check hooks, it has been found desirable to adapt the resilient member A for universal use, and accordingly there is provided a flexible thong B for coöperative use with the resilient member. This thong is illustrated in Fig. 5 as having a narrow central portion 14 where the member is folded upon itself, and the widened end portions 15. Within these widened portions 15 there may be provided any suitable means, such as a slit 16 to be engaged by the check hook. One end 15 of the flexible member B is preferably passed through the eye of the resilient member A to bring its narrow portion 14 into engagement with each of the converging arms 12 and to conceal the ends 13 thereof. The formation of the arms 12 is preferably such that the portion 14 of the thong B will rest against the inclined portion of the arms. When the device is first presented to a customer, the thong ends 15 may be secured in their adjusted relation by any suitable detachable means such as a stitch indicated at 17, or any other suitable fastening device.

In operation, the check rein C is secured to the portion 18 of the eye, while the thong B is positioned opposite thereto in the eye. The thongs being of substantially equal width at the portion 14, may be readily passed between the arms 12 and its ends 13 when abnormal strain is suddenly placed upon the check rein. For example, in the ordinary movement of the horse's head the position of the thong or flexible member B against the inclined portion of the arms, will withstand the pull placed thereon, but should the horse meet with an accident or stumble, causing his head to be thrown downwardly in a violent manner, the flexible member B will be suddenly drawn between the arms 12 and released from the eye. This feature not only saves damage to the check rein and hook but prevents injury to the horse's mouth. The driver may then open the ends 15 of the flexible thong B and insert one end thereof through the eye restoring the flexible thong B to its normal position, and returning the member to engagement with the check hook by means of the slits 16.

It is obvious that various changes and modifications may be made in the device, but the right is reserved to make such alterations therein as fairly fall within the scope of the appended claims.

Having thus described my invention, what I claim as new and desire to secure by Letters Patent is:

1. As a new article of manufacture, a check rein attachment comprising a metallic member bent upon itself to form an eye and two oppositely positioned arms, and a flexible member positioned within the eye of the resilient member and provided with means to engage a check hook, said arms being so arranged that they retain the flexible member within the eye and between the arms under ordinary conditions, and permit said member to pass therebetween when undue strain is placed upon the parts.

2. As a new article of manufacture, a check rein attachment comprising a resilient member bent upon itself to form an eye, a centering notch in the eye for the check rein, two oppositely positioned converging arms and a flexible member doubled upon itself to inclose the ends of the oppositely positioned arms, the free ends of the flexible member being provided with means to engage a check hook.

3. As a new article of manufacture, a check rein attachment comprising a resilient member bent upon itself from a single piece of metal to form an eye for a check rein and two oppositely positioned converging arms, and a flexible thong doubled upon itself and positioned within the eye to inclose the ends of the oppositely positioned arms and rest on the converging portions of said arms, said thong being adapted to pass between said arms when abnormal strain is placed upon the parts, thereby preventing injury to the check rein or animal by permitting separation of the parts.

In testimony whereof, I affix my signature, in presence of two witnesses.

HENRY G. WEATHERILL.

Witnesses:
JOSEPH R. EDSON,
JOHN W. MICHAEL, Jr.